United States Patent [19]

Laing et al.

[11] Patent Number: 4,874,300
[45] Date of Patent: Oct. 17, 1989

[54] CERAMIC STEP BEARING IN A CENTRIFUGAL PUMP

[76] Inventors: Karsten A. Laing, 1253 La Jolla Rancho Rd., La Jolla, Calif. 92037; Ludwig Ludin, Kesselackerstr. 23, Anglikon, CH5611, Switzerland; Johannes N. Laing, 1253 La Jolla Ranch Rd., La Jolla, Calif. 92037

[21] Appl. No.: 135,733

[22] Filed: Dec. 21, 1987

[51] Int. Cl.$^4$ .................. F04B 17/00; F04B 35/04
[52] U.S. Cl. ................................ 411/420; 417/365
[58] Field of Search ................ 417/365, 420, 423 P, 417/423 S; 415/140; 384/202, 203, 204, 207, 210, 245, 610

[56] References Cited

U.S. PATENT DOCUMENTS

| | | | |
|---|---|---|---|
| 3,803,432 | 4/1974 | Laing | 310/90 |
| 4,072,446 | 2/1978 | Walker | 417/420 |
| 4,541,786 | 9/1985 | McLean | 417/407 |
| 4,614,887 | 9/1986 | Ahner et al. | 417/420 X |
| 4,629,116 | 12/1986 | Laing et al. | 417/420 X |
| 4,730,989 | 3/1988 | Laing | 417/420 X |
| 4,738,436 | 4/1988 | Loggers | 384/202 |

FOREIGN PATENT DOCUMENTS 3520595 12/1986 Fed. Rep. of Germany ...... 417/420

Primary Examiner—Carlton R. Croyle
Assistant Examiner—Eugene L. Szczecina, Jr.

[57] ABSTRACT

A step bearing with spherical gliding surfaces having a stationary mounted ceramic ball mounted on a strut, on which a magnetic rotor with a concave cap is rotating under working conditions. During operation the rotor with the cap is pressed by magnetic thrust in the direction toward the strut, while a second annular bearing member of the rotor prevents axial movement of the cap when axial forces in the direction opposite to the direction of the magnetic forces become higher than the magnetic forces.

24 Claims, 4 Drawing Sheets

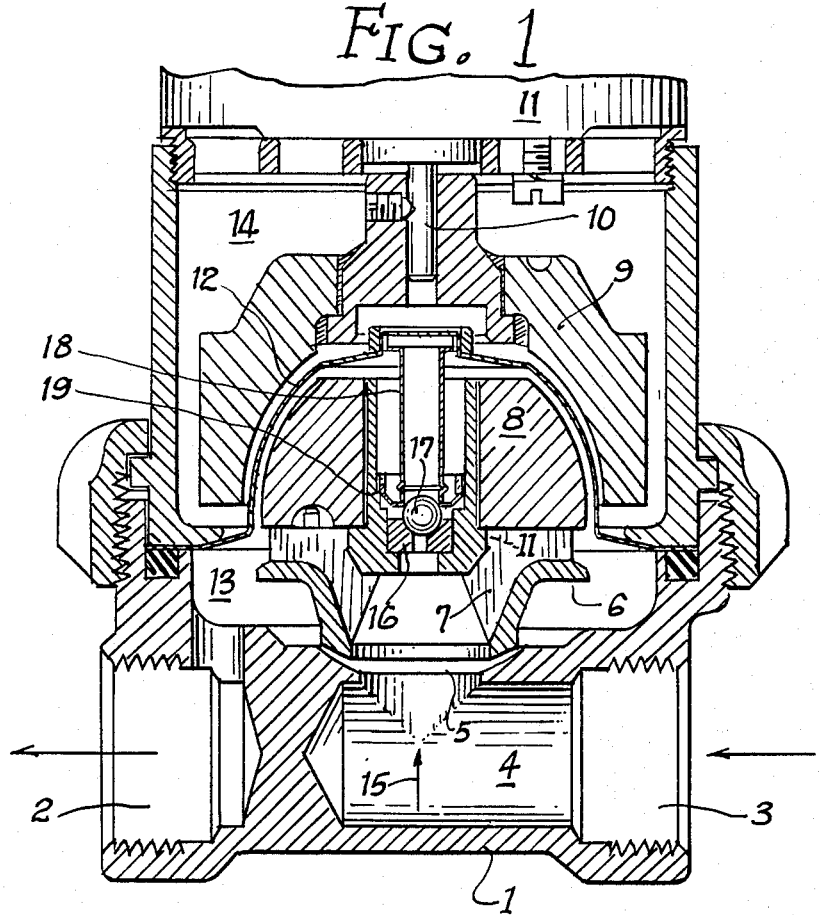
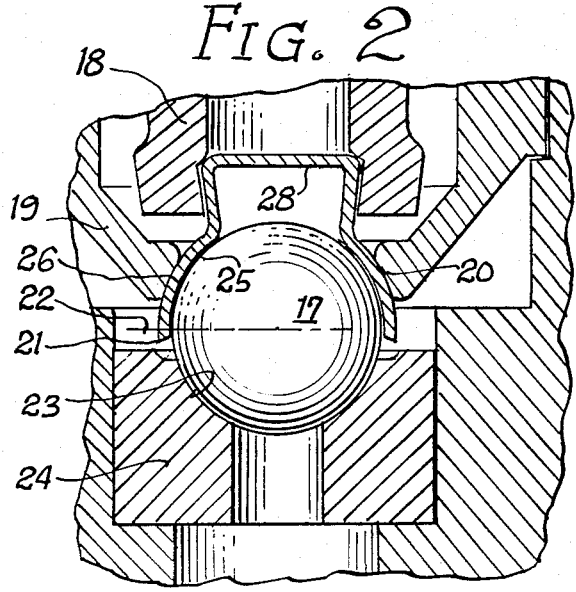
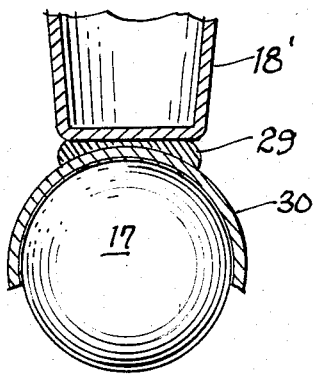

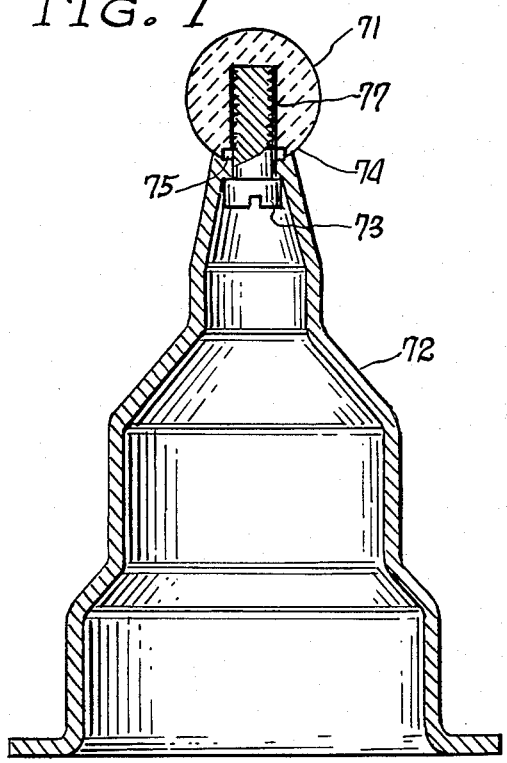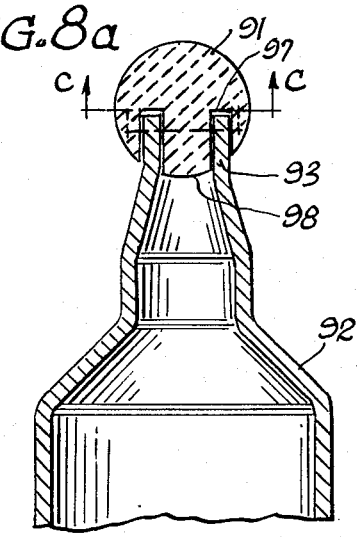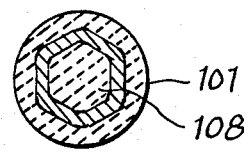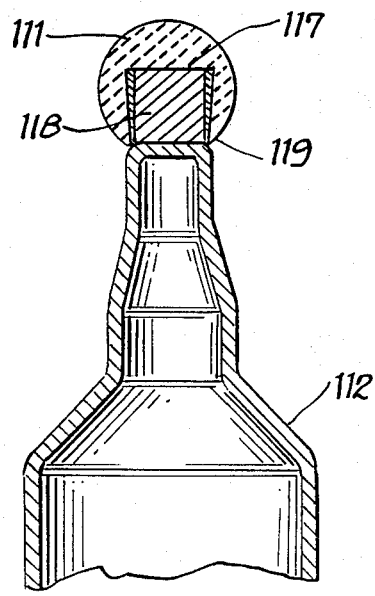

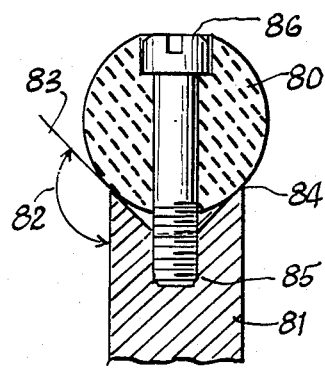
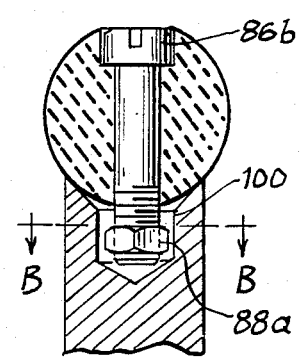
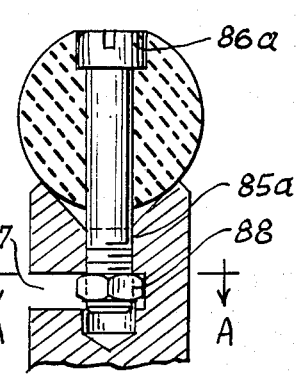
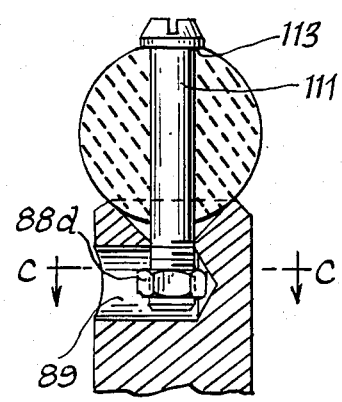
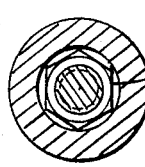
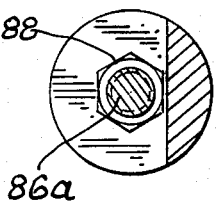
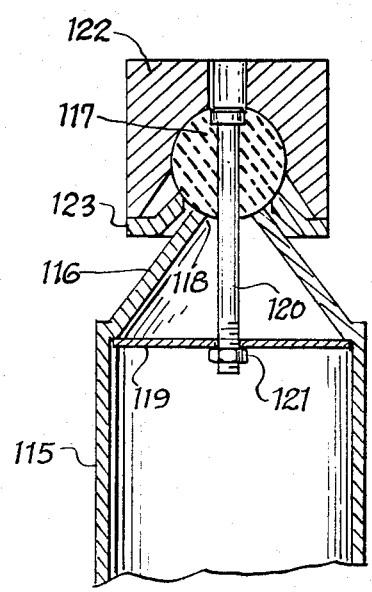
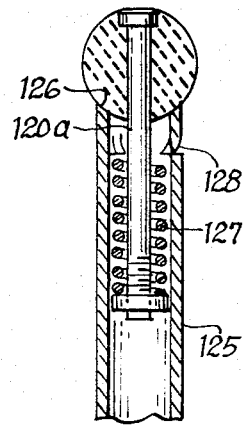
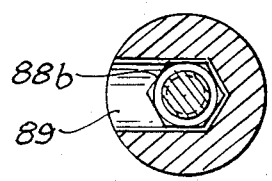

CERAMIC STEP BEARING IN A CENTRIFUGAL PUMP

BACKGROUND OF THE INVENTION

The invention relates to bearings for the rotors of electrical motors or magnetic couplings driven by a motor, which have spherical magnetic air gaps between a driven rotor and a driving stator or driving outer magnetic ring. Such spherical motors or spherical magnetic couplings are becoming more and more important in modern pump design. The rotors of spherical motors or couplings are held in position by magnetic forces pressing the rotor against a stationary mounted ball. The impellers of pumps which form a unit with the driven rotor produce hydraulic thrust counteracting the magnetic thrust. When the electricity is switched off, the magnetic force of the driven stator ceases immediately. In contrast, the hydraulic thrust, caused by the difference of pressure between the suction side of the impeller and its backside, generated by the rotation, slowly decreases with decreasing rpm of the impeller. This results in these hydraulic forces tending to lift the impeller with the rotor away from the step bearing after switching the electricity off. The same change in the direction of the axial thrust occurs in magnetic couplings, if the hydraulic forces can exceed the magnetic forces during operation. Therefore it is necessary to support the rotor, not only in the direction of the magnetic forces during constant operation but also to prevent movement in the opposite direction by a ring-shaped, rotating annular member. Spherical bearings consisting of a cap and a ball made from metal are known. Metal balls can be brazed on the tip of a strut. Unfortunately, metal bearings have the tendency to seize when dry friction causes very small fractions of the surface to reach the melting temperatures of the metal causing the cap and the ball to fuse together. Cylindrical bearings produce a film of lubricating liquid which, by hydrodynamic principle, generate high dynamic forces preventing contact between the two members of the bearing. Spherical bearings do not build up such liquid film and therefore, run either dry or semi-dry. Consequently, the probability of seizing is much larger in spherical bearings than in cylindrical bearings. This is the season that metal balls have been replaced by balls made from ceramic materials such as aluminum oxide, circonium oxide or silicon carbide. The melting point of these oxides is so high that it will never be reached by heat of friction; the same applies to silicon carbide, which in addition sublimes and it has no melting point at all.

The disadvantage of ceramic balls is that the ball can be neither welded or brazed onto the strut. It is known to the art pressfit the ball into the hollow strut by pressing the ball into a hole slightly deeper than the radius of the ball, resulting in a useable surface smaller than a hemisphere. These bearings with ceramic balls act only as a step bearing because they can only bear the axial forces in one direction. This restricts their application to spherical rotors in applications where under no circumstances hydraulic forces will not exceed the magnetic forces under any circumstances.

SUMMARY OF THE INVENTION

The invention overcomes this restriction in the application of ceramic balls. It relates to spherical bearings having a second annular bearing member. In a first solution of the invention, the ball is encased in a partially spherical metal shell. The rim of the shell reaches slightly over the equator of the ball so that the ball is clamped by said rim. The outer surface of the shell follows the spherical contour over that region of the ball, and in cases where hydraulic thrust exceeds magnetic thrust, said second annular bearing member comes into contact with the shell on its spherical surface.

A second solution of the invention provides a circular groove in the ball with a distance from the equator wide enough to leave a sufficient gliding surface for said annular bearing member.

A third solution of the invention forms a stem on the ball leaving a sufficient gliding surface for said annular bearing, the stem being pressfitted into a hole of the strut.

A fourth variant of the invention shows a ball with a groove and a metal part fixed in a slot.

A fifth variant of the invention shows a ball with a hole through the ball and a screw to fix the ball on the strut, preferably by means of a spring to dampen severe shock.

SHORT DESCRIPTION OF DRAWINGS

The invention shall be explained by embodiments of the foregoing characteristic features.

FIG. 1 is a cross section of a pump with a magnetic coupling.

FIG. 2 shows an enlarged design of the bearing with a shell.

FIG. 3 shows an alternative way to fasten the shell to a strut.

FIGS. 7 shows a design with a ball having a hole.

FIGS. 8a and 8b show a ball with an axial groove.

FIG. 9 shows a ball with a hole forming a slight undercut.

FIG. 10 shows a ball screwed to a strut.

FIG. 11a and 11b show a variant of FIG. 10 with a nut in a hole.

FIGS. 12a and 12b show a variant of FIG. 10 with a nut positioned in a slot.

FIGS. 13a and 13b show a variant of FIG. 10 with a nut in a hole.

FIG. 14 shows a design with a ball being spring-loaded by a spring washer.

FIG. 15 shows a similar design as a FIG. 14 with a screw type spring.

DETAILED DESCRIPTION OF THE PREFERRED EMBODIMENTS

Figure 4:
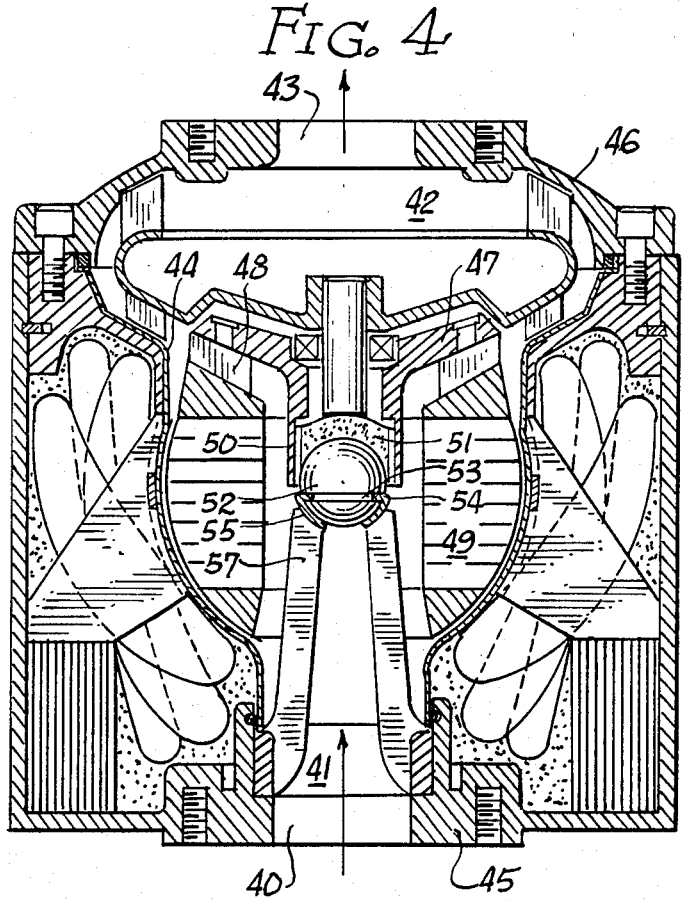
FIG. 4 shows a cross-section of a pump whereby the ball has a groove.

FIG. 1 illustrates a cross section through a centrifugal pump with a housing 1, having an outlet opening 2 and inlet opening 3. The duct 4 leads fluid to the eye region 5 of the impeller 6. The impeller 6 with the veins 7 and the convex magnet 8 forms a rotating unit. This rotating unit is driven by the concave magnet 9 mounted on the shaft 10 of the motor 11. Between the convex magnet 8 and the concave magnet 9 lies the separation wall 12 which separates the wet compartment 13 from the dry compartment 14. The rotating impeller-magnet unit 6, 7, 8 is attracted by magnetic forces in the direction of the arrow 15. The step bearing is formed by the rotating cap 16 and the stationary ball 17. The cap is part of the rotating impeller-magnet unit. The ball is fixed on strut 18 which forms a part of the separation wall. Annular bearing member 19 made from slightly elastic material prevents movement of the rotating unit in the direction opposite to arrow 15. Instead of a rotating concave magnet 9 a stationary stator with windings can also produce a rotating magnetic field. The convex magnet 8 will then be substituted by a convex armature.

FIG. 2 shows an enlargement of the region encircled by circle II in FIG. 1. The ball 17 is encased by a shell 20. The rim 21 of said shell slightly overlaps the equator 22. The spherical ring portion 23 of the ball 17 forms the gliding surface with the concave region of the cap 24. The shell 20 has a spherical surface 25 forming a narrow clearance 26 with the annular bearing member 19. If the rotating unit 6, 7, 8 starts to move in the direction of arrow 15, the annular bearing member 19 gets in sliding contact with the spherical outer surface of the shell 20. The shell 20 has a protrusion 28 which is fixed to the strut by snap action or brazing. Alternatively the protrusion 28 itself could form the strut.

FIG. 3 shows a different design whereby the shell 30 forms a semi-spherical body. This body is fixed to the strut 18' by brazing material 29.

FIG. 4 shows a spherical pump motor unit with inlet opening 40, outlet opening 43 forming together with space 42 the wet part of the pump motor unit. Magnetically permeable separation wall 44 encases together with the flange portion 45 and the pump housing 46 said wet compartment. The impeller 47 with veins 48 and armature 49 form a rotating unit. The hub portion 50 of the impeller 47 contains the bearing cap 51. This cap and stationary ball 52 make up the step bearing. The ball 52 has a circular groove 53. The rim 54 of the stationary mounted shell 55 is slightly bent inward entering groove 53. The shell 55 is mounted on a strut 57. The cap 51 reaches beyond the equator 56.

Figure 5:
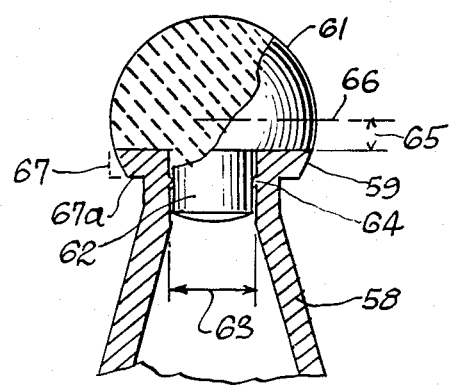
FIGS. 5 and 6 show designs of balls with a stem.

FIG. 5 shows the end portion of strut 58, consisting of a hollow body made of stainless steel sheet metal. Said strut 58 has a collar 59 which defines the seat of the annular axial surface 60 of the ball 61 produced by grinding. The inner part of the ground portion forms a stem 62. The inner diameter 63 of the strut is slightly larger than the stem 62, except in the region of the annular shoulder 64. This shoulder 64 holds the stem 62 by pressfit. The periphery of the collar 59 has a spherical configuration, matching the sphere of the ball 61. The larger diameter of said collar 59 is identical with the diameter of the ball 61 or preferably slightly smaller so that the surface 60 has a slight axial distance from the equator 66. The smaller diameter of the collar 59 matches the inner diameter of the annular member 19 shown in FIGS. 1 and 2. The method to produce the device consists of the following steps:

(a) by a grinding process, a recess on one hemisphere of the ball 61 is produced, by which process a stem 62 is formed, its length being shorter than the radius of the ball, (b) a strut 58 in the form of a body of rotation with a hollow cylindrical end portion is produced by a deep drawing process, whereby the inner diameter of said end portion is slightly smaller than the diameter of the stem 62, (c) the rim of said end portion is bent outwardly forming a flange 67a, (d) the inner diameter of said end portion is slightly increased at both sides of an annular shoulder 64, (e) the stem 62 of the ball 61 is driven through said shoulder 64 until the axial surface of the flange 67a sits on the flat annular surface 60 of the ball 61, (f) by tool machining for removal of chips, the outer surface 59 of the collar 67a becomes spherically shaped whereby the sphere matches the sphere of the ball 61.

Figure 6:
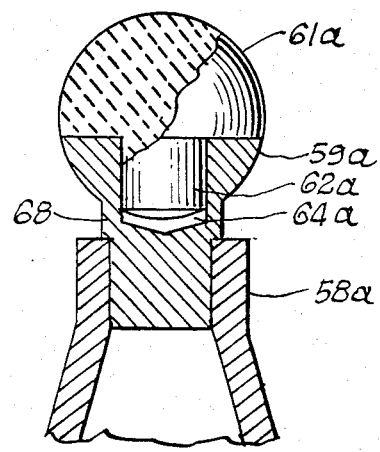

FIG. 6 shows the same ball configuration, but between the strut 58a and the ball 61a a body of rotation 68 is arranged, which is held by pressfit in a hole of the strut 58a. The stem 62a of the ball 61a is held by pressfit in the hole 64a of the body of rotation 68.

FIG. 7 shows a ball 71 with a blind end bore 77. The base around the blind end bore 77 rests on the upper arm 74 of the strut 72. A screw 73 is hollow and is used as fixture. The outer diameter of said screw 73 is slightly larger than the diameter of the hole. This results in high friction forces. The screw 73 is preferably lubricated with a viscous lubricant. After mounting the lubricant evaporates under heat treatment. It is also anticipated to use a two component resin such as epoxy which hardens and provides high shear forces. To prevent contact between the epoxy and the liquid to be conveyed an O-ring 75 will be placed into a groove.

FIG. 8a shows a ball 91 with an axial annular groove 97. The end portion 93 of the strut 92 is formed as a hexagon providing high friction on the surface of the stem 98.

FIG. 8b shows a cross section through plane C—C in FIG. 8a.

FIG. 9 shows a ball 111 with a blind end bore having a slight undercut, its blind end bore in the region 117 being wider than the opening 119. The hole will be filled with hot metal. The metal body 118 will then be brazed to the end of the strut 112.

FIG. 10 shows a ball with a bore hole and a widened reset for the screw head. The strut 81 has a conical end portion with an opening angle equal or smaller than the complement angle to the angle 82 which matches the angle of the tangents 83. The screw 66 fits into the screw hole 85 and the ball is pressed against the rim 84.

FIG. 11a shows a variation of the design in FIG. 10, whereby a nut 88a is pressed into a hole 100 to hold the screw 86b.

FIG. 11b shows the view of the strut from above.

FIG. 12a shows a strut with a slot 87, its width matching the width of the nut 88, holding the screw 86a.

FIG. 12b shows a cross section along the line A—A in FIG. 12a.

FIG. 13a shows a similar design whereby the nut 88b is placed inside a hole 89. The screw head rests on an annular plane 113.

FIG. 13b shows a cross section through line B—B in FIG. 13a.

FIG. 14 shows a cross section through a strut 115 with a tapering end portion 116. The ball 117 rests on the rim 118. The ball is pressed against this rim 118 by the forces of a prestressed spring washer 119, which forces are transmitted to the ball 117 by a screw 120 and the nut 121. The direction of rotation to fasten said screw 120 is identical to the direction of rotation of the bearing cap 122 which is also held in position by the bearing ring 123.

In case of exorbitant forces acting on the ball 117, as may happen if a pump is dropped, the ball moves away from the rim 118 and the spring washer 119 gives way. Immediately thereafter the ball snaps back into the operational position and will be centered by the rim 118.

FIG. 15 shows a similar design as in FIG. 14, suitable for cylindrical struts 125 which have a tapering rim portion 126. The spring 127 is formed as a screw type spring, supported by three lashes 128, which are bent inwardly.

We claim:

1. A centrifugal pump-motor assembly comprising an impeller having a magnetically interactive rotor, a driving unit generating a rotating magnetic field having magnetic forces in an axial direction towards a step bearing and generally perpendicular to the plane of said rotating magnetic field, a magnetically permeable wall separating the rotor from the driving unit, wherein the improvement comprises a step bearing comprising:
   a convex member partially made of ceramic material;
   on a stationary strut fixedly supporting said convex member; and
   a rotatably and rockably mounted concave cap attached to said impeller-rotor-unit, said concave cap shaped to be supported by said convex member when proximate and gliding over said convex member wherein said separation wall encloses a common annular gliding region wherein the convex member of the step bearing consists of a ball set in a metal shell, the center region of said shell being fixed to said strut attached to a stationary part of the pump-motor assembly.

2. Centrifugal pump-motor assembly according to claim 1, wherein said spherical shell encases more than half of the surface of the ball.

3. A centrifugal pump-motor assembly in impeller having a magnetically interactive rotor, a driving unit generating a rotating magnetic field having magnetic forces in an axial direction towards a step bearing and generally perpendicular to the plane of said rotating magnetic field, a magnetically permeable wall separating the rotor from the driving unit, wherein the improvement comprises a step bearing comprising:
   a convex member partially made of ceramic material;
   a stationary strut fixedly supporting said convex member;
   a rotatably and rockably mounted concave cap attached to said rotor, said concave cap shaped to be supported by said convex member when proximate and gliding over said convex member wherein said separation wall encloses a common annular gliding region; and
   means for restraining motion of said concave cap away from said convex member wherein the rotor of which may be exposed to abnormal axial forces acting in opposite direction to the forces during normal operation, said axial abnormal forces trying to move the rotor away from said convex member.

4. Centrifugal pump-motor assembly according to claim 3, wherein said convex member comprises:
   a ball having a bore; and
   a screw which presses the ball against a rim of the strut.

5. Centrifugal pump-motor assembly according to claim 4 which also comprises a prestressed spring, suspending the screw is suspended by a prestressed spring and retained by said strut.

6. Centrifugal pump-motor assembly according to claim 5 wherein the spring is of the washer type and wherein the strut has a cylindrical portion retaining the spring and a tapering portion forming the seat for the ball.

7. Centrifugal pump-motor assembly according to claim 4 wherein the ball is pressed against the rim (84) of a conical hole in said strut.

8. A centrifugal pump-motor assembly comprising an impeller having a magnetically interactiveactive rotor, a driving unit generating a rotating magnetic field having magnetic forces in an axial direction towards a step bearing and generally perpendicular to the plane of said rotating magnetic field, a magnetically permeable wall separating the rotor from the driving unit wherein the improvement comprises a step bearing comprising:
   a convex member partially made of ceramic material;
   a stationary strut fixedly supporting said convex member;
   a rotatably and rockably mounted concave cap attached to said rotor, said concave cap shaped to be glidingly supported by said convex member when said cap is forced into or away from said convex member, wherein said wall encloses said cap within a common annular gliding region; and
   a ball assembly attached to said convex member, said ball assembly consisting of:
   a generally spherically shaped ball having a recess;
   a stem portion attached to said ball and being fixed in a hole of said strut; and
   a collar portion attached to said ball having a periphery lying in the same sphere as the remaining part of said ball.

9. Centrifugal pump-motor assembly according to claim 8 characterized in that said strut's surface at said hole also consists of an annular shoulder shaped and dimensioned to pressfit on the surface of said stem.

10. Centrifugal pump-motor assembly according to claim 8, wherein said ball assembly also consists of a body of rotation which incorporate said collar portion lying in the sphere of the ball and the stem, said body of rotation being held by pressfit in the hole.

11. A centrifugal pump-motor assembly with an impeller having a magnetically interactiveactive rotor, a driving unit generating a rotating magnetic field having magnetic forces in an axial direction towards a step bearing and generally perpendicular to the plane of said rotating magnetic field, a magnetically permeable wall separating the rotor from the driving unit, wherein the improvement comprises a step bearing comprising:
   a convex member partially made of ceramic material;
   a stationary strut fixedly supporting said convex member;
   a rotatably and rockably mounted concave counterpart attached to said rotor, said concave cap shaped to be supported by said convex member when proximate and gliding over said convex member wherein said wall encloses annular gliding region; and
   a ball assembly attached to said convex member, said ball assembly consisting of:
   a generally spherically shaped ball having a counter blind end bore and;
   a rod-shaped member attached to said ball and being fixed in a hole of said strut.

12. Centrifugal pump-motor assembly according to claim 11, wherein the rod-shaped member is a screw having a screw head inside the strut.

13. Centrifugal pump-motor assembly according to claim 12, wherein the screw is hollow.

14. Centrifugal pump-motor assembly according to claim 12, wherein the screw is glued inside the blind end bore whereby a water tight seal is arranged between the ball and the strut.

15. Centrifugal pump-motor assembly according to claim 11, wherein the blind end bore in the ball is filled with a metal, said metal being brazed on the strut.

16. A centrifugal pump-motor assembly comprising an impeller having a magnetically interactive rotor, a driving unit wherein the rotor is driven by said driving part generating a rotating magnetic field having magnetic forces in an axial direction towards a step bearing and generally perpendicular to the plane of said rotating magnetic field, a magnetic gap separating the rotor from the driving unit, wherein the improvement comprises a step bearing comprising:
  a concave cap attached to said rotor;
  a convex counterpart partially made of ceramic material enclosed within an annular gliding region, wherein said concave cap is shaped to be supported by said convex counterpart when proximate and gliding over said convex counterpart and wherein the said convex counterpart includes a stem and a ball having an axial circular groove; and
  a strut supporting said convex counterpart, said strut having a hollow end portion which forms a polygon, providing friction towards the stem.

17. A centrifugal pump-motor assembly comprising an impeller having a magnetically interactiveactive rotor, a driving unit generating a rotating magnetic field having magnetic forces in an axial direction towards a step bearing and generally perpendicular to the plane of said rotating magnetic field, a magnetically permeable wall separating the rotor from the driving unit, wherein the improvement comprises a step bearing comprising:
  a convex member;
  a stationary strut fixedly supporting said convex member;
  a rotatably and rockably mounted concave cap attached to said rotor, said concave cap shaped to be supported by said convex member when proximate and gliding over said convex member wherein said concave cap is enclosed within an annular gliding region; and
  a ball assembly attached to said convex member, said ball assembly consisting of:
    a generally spherically shaped ball having a through bore; and;
    a screw therethrough which presses the ball against a rim attached to said strut.

18. Centrifugal pump motor assembly according to claim 17, which also comprises a prestressed spring wherein the screw is suspended by said prestressed spring which is attached to said strut.

19. Centrifugal pump motor assembly according to claim 18, wherein the spring is of the washer type and the strut has a cylindrical portion, and wherein said spring is attached to a tapering portion of said strut, and the end of said tapering portion forms a seat for the ball proximate to said ball.

20. Centrifugal pump motor assembly according to claim 17 having said ball pressed against a rim of a conical hole in said strut.

21. Centrifugal pump motor assembly according to claim 20 wherein said screw is also held by a nut nesting in a hole within said strut and extending perpendicular to the strut.

22. Centrifugal pump-motor assembly as per claim 1, wherein the hemisphere surface of the ball which forms a gliding region with the cap, is composed of ceramic material, and said ball assembly also consists of an auxiliary bearing member and an undercut region on said ball which forms a working clearance with the auxiliary bearing member, said undercut region partially composed of metallic material.

23. Method to produce a step bearing from a strutbillet, a ceramic ball and a stem attached to the ball, said method which comprises:
  grinding a recess on one hemisphere of the ball having a length shorter than the radius of the ball;
  deep drawing the strut billet in the form of a body of rotation with a hollow cylindrical end portion, whereby the inner diameter of said end portion is slightly smaller than the diameter of the stem;
  bending a rim of said end portion outwardly forming a flange;
  slightly increasing the inner diameter of said end portion at both sides of a remaining ring portion forming an annular shoulder (64),;
  driving the stem attached to the ball through said shoulder until the axial surface of the flange sits on the surface of the ball.
  machining the outer surface of the flange becomes spherically shaped whereby the spherically shaped surface matches the sphere of the ball.

24. A pump-motor assembly with a centrifugal impeller forming a unit with a magnetically active rotor driven by a driving part generating a rotating magnetic field which in addition generates normal magnetic forces in an axial direction towards a step bearing and generally perpendicular to the plane of said rotating magnetic field, the rotating unit being supported by a step bearing wherein the improved step bearing comprises:
  a ceramic ball;
  a stationary strut fixedly supporting said ball on a circularly shaped seat;
  a rotatably and rockably mounted concave bearing cap attached to said rotating unit, said concave bearing cap shaped to be carry all axial forces acting in a first direction when proximate and gliding over said convex member;
  a bolt attached at one end to said ball;
  a spring member attached to the other end of said bolt and retained by said strut; and
  a bearing ring attached to said rotating unit and having an aperture smaller than the diameter of said ball and larger than the diameter of said seat, said bearing ring shaped and positioned to form a bearing against axial forces acting in a direction opposite to said first direction.

* * * * *